Aug. 8, 1939. M. A. LEWIS 2,168,908
AUTOMOBILE SAFETY BUMPER
Filed July 1, 1935 2 Sheets-Sheet 1
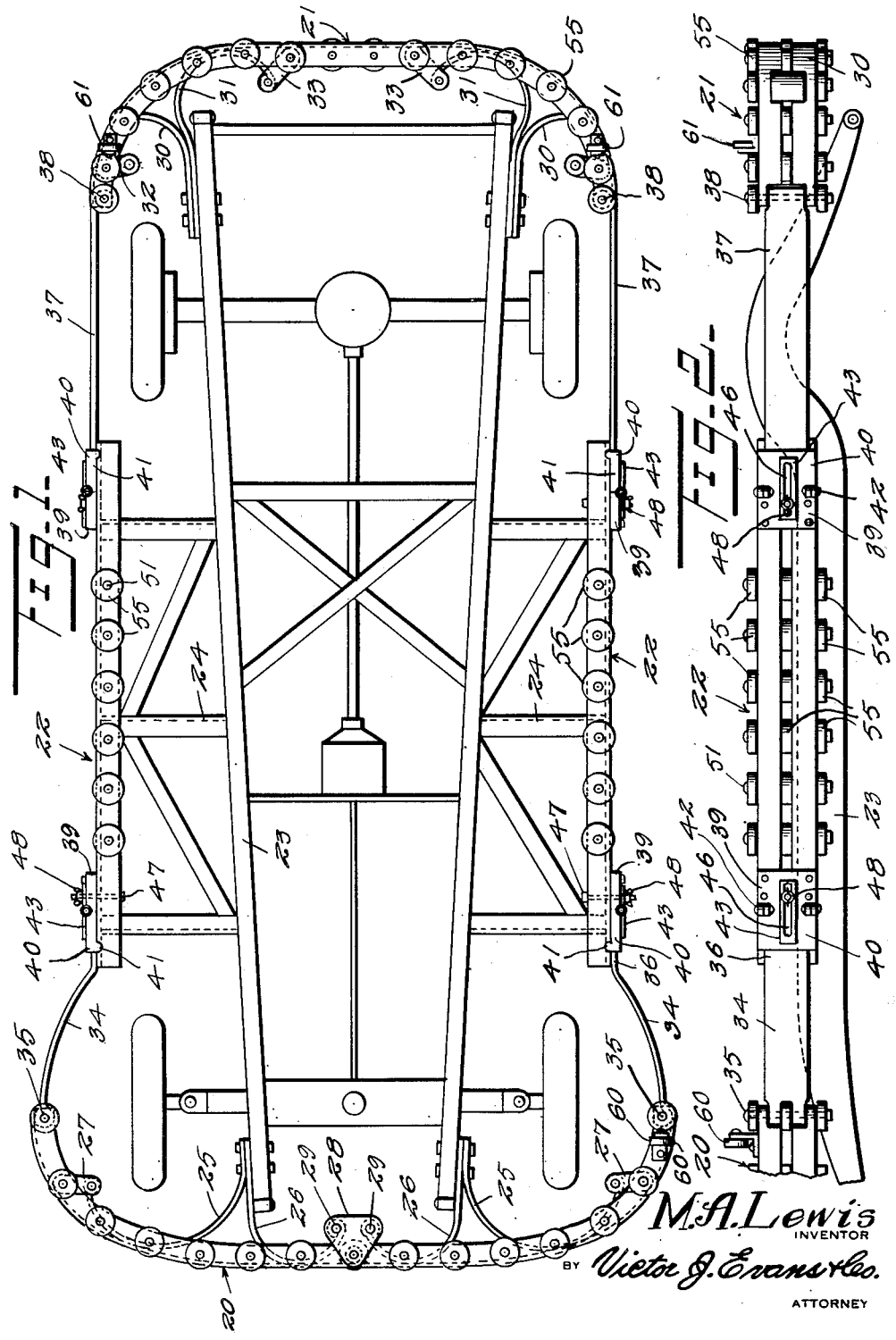

Aug. 8, 1939.     M. A. LEWIS     2,168,908
AUTOMOBILE SAFETY BUMPER
Filed July 1, 1935     2 Sheets-Sheet 2
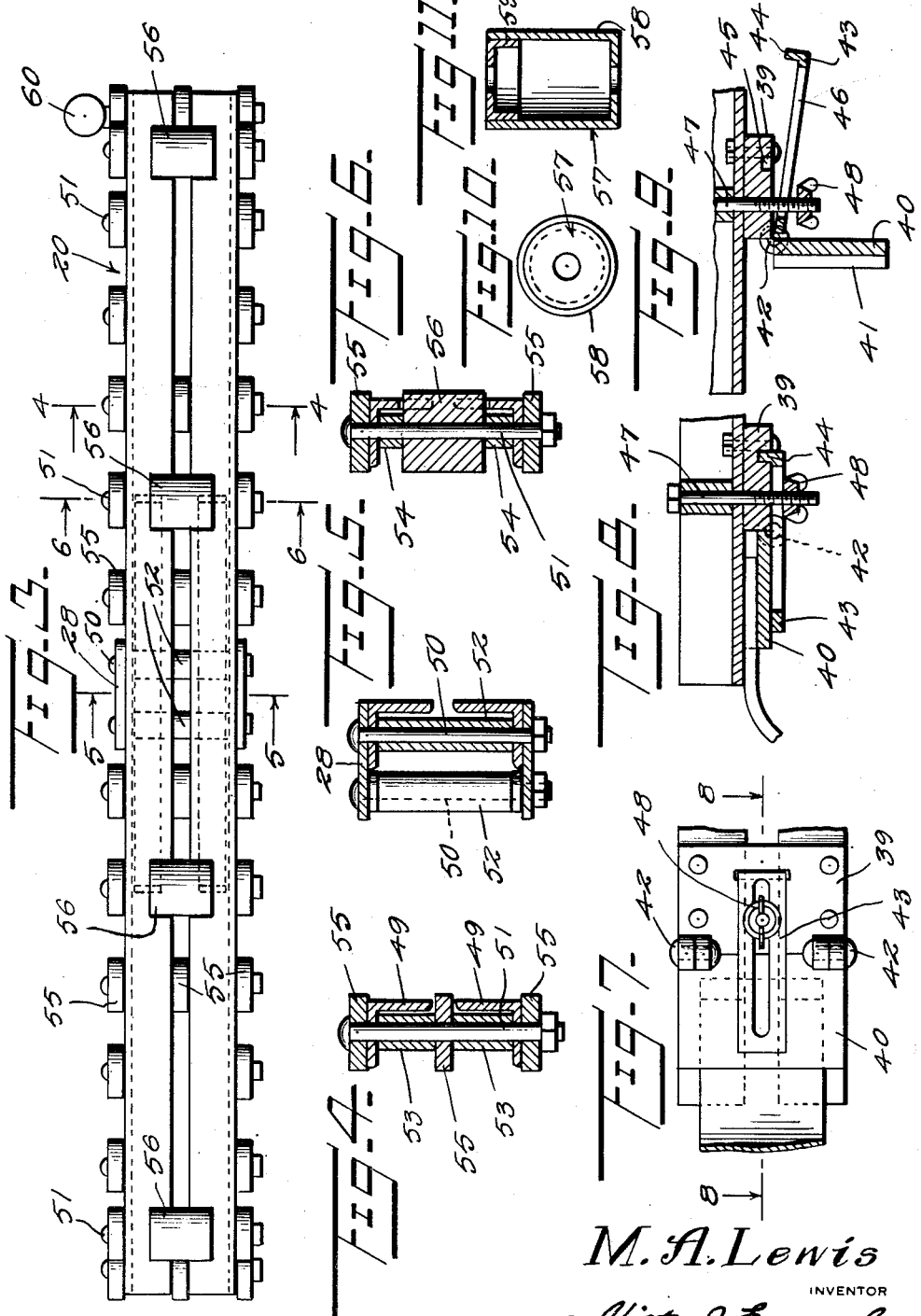
M. A. Lewis
INVENTOR
BY Victor J. Evans & Co.
ATTORNEY Patented Aug. 8, 1939

2,168,908

UNITED STATES PATENT OFFICE 2,168,908

AUTOMOBILE SAFETY BUMPER

Melville A. Lewis, Detroit, Mich.

Application July 1, 1935, Serial No. 29,247

7 Claims. (Cl. 293—55)

The object of the invention is to provide an automobile bumper construction so arranged that it will completely encircle the body of the equipped automobile to shield the latter from impacts at the front or rear and likewise at the sides; to provide such a bumper construction composed of a series of consecutively rigid and resilient elements, so that after impact original position of the yielding bumper section will be immediately resumed; to provide a bumper construction embodying elements adapted to deflect from them impacting bodies; and generally to provide a bumper construction which, for the function to be performed, is of comparatively simple form and susceptible of cheap manufacture.

With this object in view, the invention consists in a construction and combination of parts of which a preferred embodiment is illustrated in the accompanying drawings, wherein:

Figure 1 is a plan view of a motor vehicle frame with the invention applied in operative position thereon.

Figure 2 is a side elevational view of the structure of Figure 1.

Figure 3 is a front elevational view of the structure of Figure 1.

Figures 4, 5 and 6 are sectional views on the planes indicated by the lines 4—4, 5—5 and 6—6 respectively of Figure 3.

Figure 7 is a detail elevational view illustrating the releasable latch engaging the interconnecting members betwen the lateral and end bumpers.

Figure 8 is a sectional view on the plane indicated by the line 8—8 of Figure 7.

Figure 9 is a view similar to Figure 8 but showing the latch member in released position.

Figure 10 is a top plan view of a hollow form of roller susceptible of use in the invention.

Figure 11 is a sectional view taken in a plane in the axis of the hollow roller.

Designed to completely encircle the car of which it forms a part of the equipment, the invention comprises the forward and rear bumpers 20 and 21 and the lateral bumpers 22, the whole set being supported from the motor vehicle chassis 23, having the laterally extending side frames 24 by which the running boards are supported.

The front and rear bumpers are both resiliently mounted, the former by means of curved spring flat bracket bars 25 and 26 which are secured in pairs consisting of one of each bolted or otherwise attached to the forward ends of the side rails of the chassis.

The outer ends of the bracket bars 25 are connected with shackles 27 which are in turn secured to the bumper 20. The corresponding ends of the bracket bars 26 are connected to the triangular shackle plate 28 which is secured to the bumper 20 at its center. The shackles 27 and shackle plate 28 are in pairs applied to the top and bottom of the bumper respectively, the bracket bars being coiled to provide eyes at their outer extremities and bolts 29 which pass through the shackles and shackle plate serve to secure the bracket bars to the shackles and at the same time provide for pivotal movement at the points of connection, so that there will be no strain on the bracket plates when yielding to an impact applied to the bumper.

The rear bumper 21 is mounted in a similar fashion to the forward bumper 20, bracket plates 30 and 31 being employed for this purpose, the outer ends of the former being connected to shackles 32 and the outer ends of the latter to shackles 33, the connections between the bracket bars and the shackles being identical to that between the bracket bars 25 and 26 and their shackles.

The side bumpers 22 are mounted on the lateral frames 24, so that they act as edge guards for the running board and serve to take any impact applied laterally to the vehicle.

Both the front and rear bumpers are generally arcuate, the latter extending rearwardly and the former forwardly at their extremities. The forward bumper, however, is connected with the forward ends of the lateral bumpers by means of resilient gate strips 34, hingedly connected at 35, with the ends of the bumper. These gate strips are arcuate with straight terminals 36 which are received by latch members carried by the lateral bumpers. Similar gate strips 37 which are hingedly connected at 38 with the rear bumper at its extremities, have a releasable latch connection with the rear ends of the lateral bumpers.

The latching means is so constructed that the gate strips may move relatively to them in the direction of the length of the gate strips but may not swing laterally on their hinge connection. To this end the latch members consist each of a base block 39 secured to the lateral bumper 22 and a swinging leaf plate 40 hinged to the base block but not so thick as the latter. The leaf plate, however, is provided with upper and lower inturned flanges 41 which abut the upper and lower edges of the gate strips when the leaf plates are in latcing or retaining position for the strips. The leaf plates are swingingly mounted on their base blocks by means of contacting ears through which extend hinge pins 42.

Means is provided in each latch member to retain the leaf plate in contact with the connected gate strip and this means consists of a slotted plate 43 provided with an angularly turned end 44 receivable in a slot 45 formed in the outer face of the base block. Through the slot 46 in the plate 43 there passes the shank of a bolt 47 carried by the bumper 22. On the outer threaded end of the bolt, there is a wing nut 48. On release of the wing nut, the plate 43 may be moved in the direction of the length of the bolt 47 to disengage the angular end from the slot 45. Thereafter the plate may be slipped back to a position where it will not overlap the leaf plate 40, when the latter will swing on its hinge connection and thus release the latched end of the gate strip. The engagement of the angular end in the slot 45, however, disposes the plate 43 over the leaf plate, so that when the wing nut is screwed down on the bolt 47, the plate will hold the leaf plate in a position where it will overlap the gate strip. Relative movement between the gate strips and the latch members is provided, however, by reason of the fact that the leaf plate serves as a keeper and not as a clamp for the free end of the gate strip, the flanges 41 abutting the face of the lateral bumper. The slotted plates 43 are made preferably of spring steel to give them resiliency.

Except for general contour to adapt them to the particular places on the vehicle they are designed to occupy, the forward, rear and lateral bumpers are identical, each consisting of a pair of angle bars 49, assembling bolts 50 and 51 and spacers 52, 53 and 54. The upper and lower angle bars have their flanges directed towards each other but the spacers serve to hold the adjacent edges separated, abutting the spaced parallel flanges of the two angle bars through which the bolts pass. The bolts 50 serve to secure the shackle 28 to the bumper and to serve as an attaching post for the bracket bars 26. The angle bars are preferably made of stainless steel.

Rollers 55 are carried by the bolts 51 above and below the assembled bars and between the spacers 53, so that they project through the spaced edges of the two angles, the rollers being of sufficient radius to have them protrude slightly beyond the bumper face.

On the front and rear bumpers, the angles are cut away in their vertical flanges to provide clearance spaces for the rollers 56 which are carried by certain of the bolts 51 with the spacers 54 intervening between them and the parallel or horizontal flanges of the angles. The rollers 56 are of the same radius as the rollers 55. The rollers are preferably made of stainless steel sheet metal. The physical properties combining unusual resistance to corrosion, deep drawn and finally exquisitely polished to a mirror surface which remains permanent, as an adequate material of construction for a wide variety of application makes it a logical selection.

The larger roller 56, instead of being made solid, may be of hollow form as shown in Figures 10 and 11, at 57, these hollow rollers consisting of telescoping elements 58 and 59 of which the former is cylindrical with an open upper end into which the peripherally flanged member 59 is inserted.

In use, the construction provides for yielding of either the front or ear bumper, by reason of the resilient bracket bars by which they are mounted and the yieldable gate strips which connect them with lateral bumpers, the latched ends of the gate strips sliding in their retaining latches. The gate strips are made releasable, so that access may be had to the wheels for changing tires, it being only necessary to release the lateral bumper latches to allow the gate strips to be swung laterally out of the way so that a tire or wheel may be removed. The lateral bumpers tend to deflect an impacting object, or to deflect the equipped car in the event of its engaging an immovable object, the rollers rotating on the mounting bolts in such a contingency. On the front and back bumpers, the rollers also function in any glancing impact. By reason of the slotted plates 43 being resilient, lateral yielding of the leaf plates outwardly is made possible to relieve the gate strips from undue bending strain in the event of more than usual distortion of the bumper at one side due to an impact.

It is advisable to provide the equipment with mirrors at the left side, so as to indicate to approaching cars the extreme left hand edge of the bumper structure. Such a mirror, as indicated at 60, is mounted on the front bumper adjacent the hinge connection 35 and a similar mirror, as indicated at 61, on the rear bumper adjacent the shackle 30.

The invention having been described, what is claimed as new and useful is:

1. In an automobile bumper, forward, rear and lateral bumper units mounted on the chassis, in combination for same in an end to end series around the chassis adjacent bumper units being spaced from each other, and flexible gate strips connecting the bumper units and bridging the spaces, resilient bracket bars secured to the chassis, and shackles carried by the front and rear bumper units and having pivotal connections with the resilient bracket bars, which are in turn secured to the bumper units by the use of shackle plates mounted in pairs and applied to top and bottom of the bumper units respectively, including triangular shackle plates which are secured to aforesaid forward unit in the center to provide a pivotal movement at the point of connections, and to yield to the impact applied to the bumper as a relief to the strain on connections.

2. In an automobile bumper a front and rear bumper unit in combination for the same, said front unit comprising a pair of opposed angles with their adjacent edges separated, in spaced apart relation, arcuate in formation and means for connecting said angles in this relation, shackle plates secured to the center of said unit and additional shackle plates secured to same and near each end thereof, resilient yieldable means comprising pairs of resilient brackets secured to the front end of an automobile chassis and resiliently coacting with the shackle plates and shackles aforesaid.

3. In an automobile bumper a front, rear and side bumper unit in combination for the same, said front unit comprising an arcuate formation of spaced apart angles in opposed relation, shackle plates secured to the center of said front unit and additional shackle plates secured to each end portion thereof, a running board supporting frame secured to each side of an automobile chassis, pairs of resilient brackets secured to the front end of said chassis and resiliently coacting with said shackle plates and shackles, aforesaid side bumper units each comprising a pair of spaced apart angles with their adjacent edges separated, said angles secured to respective running board supporting frames, releasable latching means upon each of said side bumper units, a pair of resilient gate strips hingedly engaging aforesaid front bumper unit and coacting with said latching means.

4. In an automobile bumper a front, rear and side bumper unit in combination for the same, a running board supporting frame secured to each side of an automobile chassis, each of said side bumper units comprising a pair of spaced apart angles with their adjacent edges separating and means for connecting said angles in this relation, also means for securing the unit to said chassis, a pair of resilient gate strips hingedly engaging aforesaid front bumper unit, releasable latching means upon the front end of each of said side bumper units and said gate strips coacting with the same; said latching means each comprising a plate secured to the side of said bumper unit, an additional plate hingedly engaging the first-named plate and a bolt passing through this plate and projecting laterally therefrom and having a wing nut engaging the same, the end of aforesaid gate strips detachably interposed between the side bumper and said hinged plate, a resilient and slidable slotted plate adapted to hold the hinged plate normally engaging said plate and gate strip in a locked position for supporting the latching unit through said wing nut so as to prevent undue bending strain being imposed upon said gate strip.

5. In an automobile bumper a front, rear and side bumper unit in combination for the same, said front unit comprising an arcuate formation of a pair of opposed angles with their adjacent edges separated, a plurality of spaced apart roller units connecting said angles, each of said roller units comprising a hollow formed metal roller mounted upon the top of the upper angle and a similar roller disposed upon the bottom of the lower angle, also a similar roller disposed intermediate said angles and a spacer upon each side of the last-named roller, a bolt passing through said angles and the spacers and all of said rollers, and the rollers projecting from the face of aforesaid angles in a manner so that the rollers will be freely rotatable when thereby assembled.

6. In an automobile bumper a front, rear and side bumper unit in combination for the same, said rear bumper unit being an arcuate formation of a pair of opposed spaced apart angles with their adjacent edges separated, with a series of roller units therein as described in claim 5; releasable latching means upon the rear end of said side bumper units, a pair of resilient gate strips hingedly secured to said rear bumper unit and coacting with said latching means, pairs of resilient brackets secured to the rear of an automobile chassis, a series of shackle plates secured to the rear bumper unit and said brackets being connected to said shackles.

7. In an automobile bumper a front, rear and side bumper unit in combination for the same, an arcuate formation of opposed angles with their edges separated, comprising the front and rear bumper units, a plurality of spaced apart rotatable rollers disposed upon the top of the upper angle in each of said front and rear units, a similar series of rollers disposed upon the bottom of the lower angle, and an additional series of rollers disposed intermediate said angles and spacer means for the last-named rollers, also a bolt passing through the angles, rollers and spacers in a manner so that all of the aforesaid rollers project from the face of aforesaid angles and are freely rotatable; shackle means upon each of said front and rear bumper units, a series of pairs of resilient brackets secured to the front and rear of an automobile chassis and coacting with said shackle means, a running board supporting frame secured to each side of said chassis, said bumper unit secured to said frame and having a series of hollow roller units similar to said front and rear bumper units, each of said side bumper units having upon its front and rear end releasable latching means, a pair of resilient gate strips hingedly secured to each of said front and rear bumper units and coacting with the respective latching means.

MELVILLE A. LEWIS.